United States Patent
Holder et al.

(10) Patent No.: US 9,401,741 B2
(45) Date of Patent: Jul. 26, 2016

(54) METHODS AND SYSTEMS FOR MITIGATING SIGNAL INTERFERENCE

(71) Applicants: Ernest Jefferson Holder, Canton, GA (US); George Martin Hall, Sebastian, FL (US)

(72) Inventors: Ernest Jefferson Holder, Canton, GA (US); George Martin Hall, Sebastian, FL (US)

(73) Assignee: Propagation Research Associates, Inc., Marietta, GA (US)

( * ) Notice: Subject to any disclaimer, the term of this patent is extended or adjusted under 35 U.S.C. 154(b) by 140 days.

(21) Appl. No.: 13/741,732

(22) Filed: Jan. 15, 2013

(65) Prior Publication Data

US 2014/0198885 A1   Jul. 17, 2014

(51) Int. Cl.
| | |
|---|---|
| *H04B 1/10* | (2006.01) |
| *H04B 1/7097* | (2011.01) |
| *H04B 7/08* | (2006.01) |
| *H04B 1/7093* | (2011.01) |

(52) U.S. Cl.
CPC ............... *H04B 1/7097* (2013.01); *H04B 1/10* (2013.01); *H04B 1/7093* (2013.01); *H04B 7/08* (2013.01)

(58) Field of Classification Search
CPC .......... H04B 7/08; H04B 1/10; H04B 1/1027; H04B 1/7097; H04B 1/7093; H04L 1/0631
USPC ......... 375/148, 346, 347, 350; 455/63.1, 296, 455/269, 272
See application file for complete search history.

(56) References Cited

U.S. PATENT DOCUMENTS

| | | |
|---|---|---|
| 6,697,633 B1 | 2/2004 | Dogan et al. |
| 6,711,219 B2 | 3/2004 | Thomas et al. |
| 6,856,945 B2 | 2/2005 | Thomas et al. |
| 7,099,377 B2 | 8/2006 | Berens et al. |
| 7,110,434 B2 | 9/2006 | Currivan et al. |
| 7,120,657 B2 | 10/2006 | Ricks et al. |
| 7,136,410 B2 | 11/2006 | Choi et al. |
| 7,167,884 B2 | 1/2007 | Picciolo et al. |
| 7,177,351 B2 | 2/2007 | Kadous |

(Continued)

OTHER PUBLICATIONS

Louis L. Scharff and Michael L. McCloud, Blind Adaptation of Zero Forcing Projections and Oblique Psuedo-Inverses for Subspace Detection and Estimation When Interference Dominates Noise, IEEE Transactions on Signal Processing, Dec. 2002, pp. 2938-2946, vol. 50, No. 12, IEEE.

(Continued)

*Primary Examiner* — Betsy Deppe
(74) *Attorney, Agent, or Firm* — Robert A. Blaha; Smith Tempel Blaha LLC

(57) ABSTRACT

A received signal that includes a target signal and an interference signal is sampled in space and time and then filtered into a matched-filtered signal and into a mis-matched-filtered signal, which is orthogonal to, or nearly orthogonal to, the matched-filtered signal The interference signal is present in both the matched-filtered signal and the mis-matched-filtered signal, whereas the target signal is present in only the matched-filtered signal. In the mis-matched-filtered signal, the interference signal is different from the matched-filtered signal in the temporal property, but is the same as the matched-filtered signal in the spatial property. After the matched-filtered signal and the mis-match-filtered signals have been obtained for the signals received by each antenna element of an array of antenna elements, they are processed to obtain a result vector, W, that is a representation of the target signal without the interference.

19 Claims, 4 Drawing Sheets

(56) References Cited

U.S. PATENT DOCUMENTS

| | | |
|---|---|---|
| 7,333,919 B2 | 2/2008 | Hayward et al. |
| 7,359,465 B2 | 4/2008 | Olson et al. |
| 7,420,509 B2 | 9/2008 | Minkoff |
| 7,430,253 B2 | 9/2008 | Olson et al. |
| 7,463,609 B2 | 12/2008 | Scharf et al. |
| 7,626,542 B2 | 12/2009 | Kober et al. |
| 7,643,538 B2 | 1/2010 | Currivan et al. |
| 7,660,231 B2 | 2/2010 | Tulino |
| 7,873,097 B1* | 1/2011 | Luecke et al. ............ 375/147 |
| 7,907,912 B2 | 3/2011 | Nam et al. |
| 8,121,177 B2 | 2/2012 | Narayan et al. |
| 2003/0210179 A1* | 11/2003 | Dizaji et al. ............ 342/159 |
| 2005/0180364 A1 | 8/2005 | Nagarajan et al. |
| 2006/0229051 A1 | 10/2006 | Narayan et al. |
| 2011/0069796 A1 | 3/2011 | Scharf et al. |
| 2012/0016921 A1 | 1/2012 | Davenport et al. |

OTHER PUBLICATIONS

Sofiene Affes, Henrik Hansen and Paul Mermelstein, Interference Subspace Rejection: A Framework for Multiuser Detection in Wideband CDMA, IEEE Journal on Selected Areas in Communications, Feb. 2002, pp. 287-302, vol. 20, No. 2, IEEE.

Jonathan Landon, Brian D. Jeffs and Karl F. Warnick, Model-Based Subspace Projection Beamforming for Deep Interference Nulling, IEEE Transactions on Signal Processing, Mar. 2012, pp. 1215-1228, vol. 60, No. 3, IEEE.

* cited by examiner

METHODS AND SYSTEMS FOR MITIGATING SIGNAL INTERFERENCE

GOVERNMENT LICENSE RIGHTS

This invention was made with government support under Contract FA8650-11-M-1168 awarded by the U.S. Air force/Department of Defense. The government has certain rights in the invention.

CROSS-REFERENCE TO RELATED APPLICATIONS

This application is a nonprovisional application claiming the benefit of the filing date of a provisional application having application Ser. No. 61/638,934, filed on Apr. 26, 2012 and entitled "A Method and Apparatus for the Mitigation of Signal Interference," which is incorporated herein by reference in its entirety.

TECHNICAL FIELD OF THE INVENTION

The invention relates to mitigating of interfering electromagnetic signals. More particularly, the invention relates to methods and systems for dynamically identifying and mitigating interfering electromagnetic signals in real-time by using a combination of matched and mismatched filters to isolate and mitigate the interference signals.

BACKGROUND OF THE INVENTION

Electromagnetic interference occurring in a receiver modifies or disrupts a target electromagnetic signal in the receiver, resulting in degradation of the target signal. The interference may be natural or man-made. Natural electromagnetic interference sources include thermal noise sources, pulses emitted by lightning, astronomical sources, etc. Man-made electromagnetic interference sources may be unintentional sources, such as interference generated by industrial processes and household appliances, or intentional sources, such as jammers designed to reduce the effectiveness of a system, such as a cell phone system or a radar jammer system.

Such interference can seriously degrade the performance of a system that is configured to receive particular signals. For example, for a radar or sonar system, interference can result in a failure to detect an imminent threat. For navigation and position receivers, interference can result in loss of accuracy or outright jamming.

Work on mitigating electromagnetic interference dates back to the earliest days of radio. Until approximately 1950, the majority of the work consisted of means and techniques for minimizing natural and mutual interference. Post 1950, efforts began in earnest on mitigating the effect of purposeful, man-made interference.

Known techniques and systems for mitigating interference typically use the ergodic, or statistical, properties of the interference with respect to the desired signal to identify the interference and the desired signal and to create a weighting function that optimizes a cost function. Separating the signal from the interference in this manner requires averaging the signal over a time period in order to estimate signal statistics. The averaging time period is long relative to the reciprocal bandwidth of the desired signal and the interference signal. Requiring the summation over a relatively long time period assumes that the statistics of both the interference and the desired signal are stationary for the time period, which is not always a valid assumption and can lead to undesirable mitigation results.

Accordingly, a need exists for a method and system for mitigating interference that overcome the shortcomings of known systems and methods.

SUMMARY OF THE INVENTION

The invention is directed to systems and methods for mitigating interference. The system comprises an array of N spatially-separated antenna elements, where N is a positive integer that is great than or equal to 2, and N electrical processing circuits electrically coupled to N respective antenna elements of the array of antenna elements. At least one of the N electrical processing circuits includes a processor. Each of the N electrical processing circuits receives an electrical signal received by the respective antenna element and filters the respective electrical signal into a respective matched-filtered signal and into a respective mis-matched-filtered signal that is orthogonal, or nearly orthogonal, the respective matched-filtered signal. A respective target signal and a respective interference signal that are part of the respective received electrical signal are present in the respective matched-filtered signal, but only the interference signal is present in the respective mis-matched-filtered signal. The processor processes all of the matched-filtered signals and all of the mis-matched-filtered signals to generate a result vector, W, that is a representation of the target signals without the interference signals.

The method comprises:

sampling an electrical signal received by a respective antenna element of an array in time and space, the first dimension being time and the second dimension being space;

filtering the respective electrical signal into a respective matched-filtered signal and into a respective mis-matched-filtered signal that is orthogonal to, or nearly orthogonal to, the respective matched-filtered signal; and processing all of the matched-filtered signals and the mis-matched-filtered signals to generate a result vector, W, that is a representation of the target signals without the interference signals.

The invention is also directed to a computer-readable medium having computer code stored thereon for execution by a processor to perform mitigation of electromagnetic interference. In accordance with an illustrative embodiment of the computer-readable medium, the computer code comprises first and second code segments. The first code segment receives a matched-filtered signal and a mis-matched-filtered signal for each of a plurality of electrical signals that have been received by respective antenna elements of an array of N spatially-separated antenna elements, where N is a positive integer that is great than or equal to 2. A respective target signal and a respective interference signal that are part of the respective received electrical signal are present in the respective matched-filtered signal, but only the interference signal is present in the respective mis-match-filtered signal. The second code segment processes the matched-filtered signals and the mis-matched-filtered signals to generate a result vector, W, that is a representation of the target signals without the interference signals.

In accordance with another illustrative embodiment of the computer-readable medium, the computer code comprises first, second and third code segments. The first code segment receives a plurality of electrical signals that have been received by respective antenna elements of an array of N spatially-separated antenna elements, where N is a positive integer that is great than or equal to 2. The second code segment filters each received electrical signal into a respective matched-filtered signal and into a respective mis-matched-filtered signal that is orthogonal to, or nearly orthogonal to, the respective matched-filtered signal. A respective target signal and a respective interference signal that are part of the respective received electrical signal are present in the respective matched-filtered signal, but only the interference signal is present in the respective mis-matched-filtered signal. The third code segment processes the matched-filtered signals and the mis-matched-filtered signals to generate a result vector, W, that is a representation of the target signals without the interference signals.

These and other features and advantages of the invention will become apparent from the following description, drawings and claims.

DETAILED DESCRIPTION OF ILLUSTRATIVE EMBODIMENTS

Figure 1:
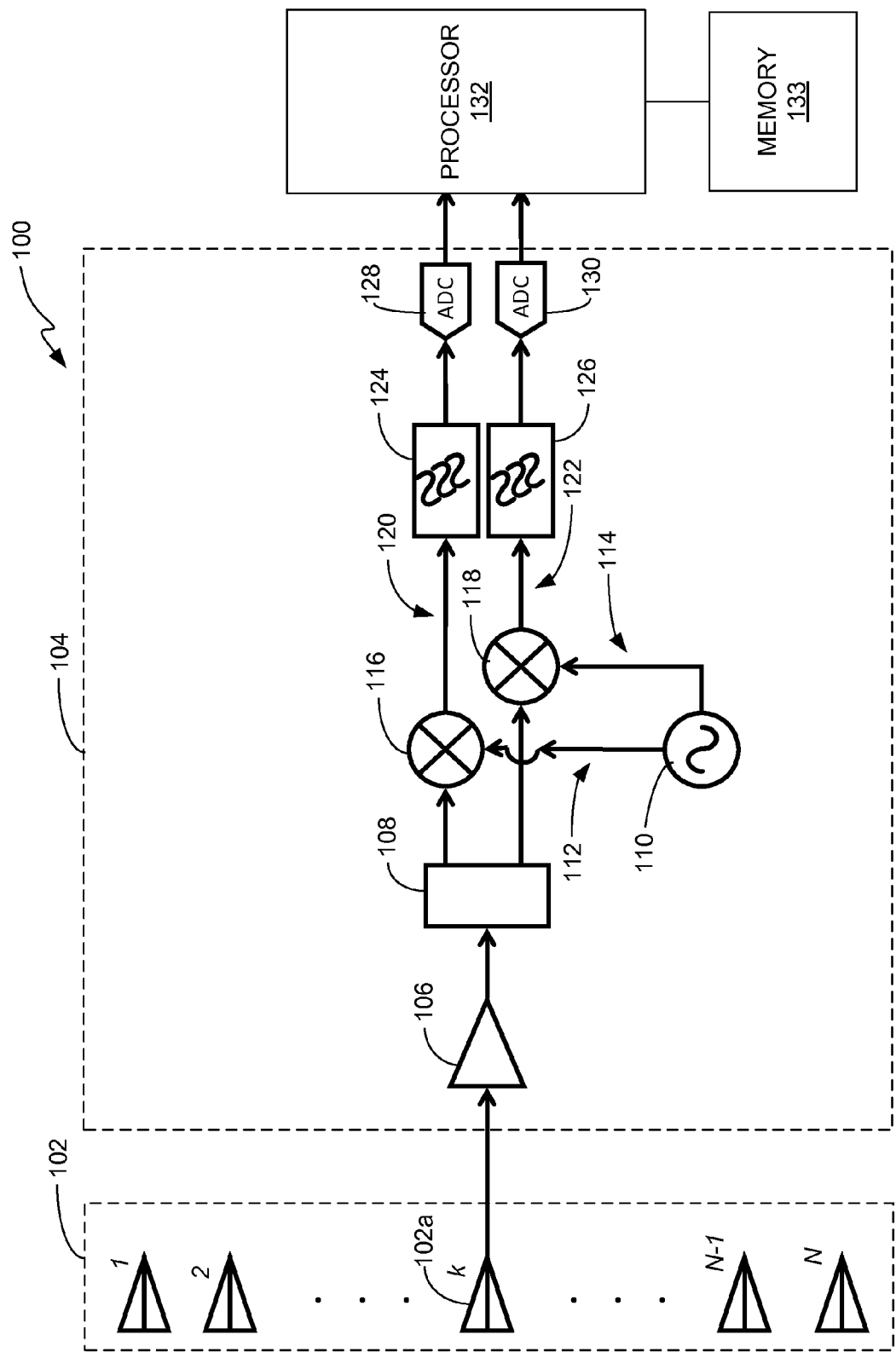
FIG. 1 is a block diagram of one illustrative embodiment of a system designed to mitigate electromagnetic interference.

The invention is directed to methods and systems for mitigating electromagnetic interference produced by natural and man-made sources. The methods and systems use signal filters to isolate an electromagnetic interference signal from a desired signal, and then use the isolated interference signal to separate the desired signal from the interference signal. In particular, a combination of matched and mis-matched (i.e., orthogonal) signal filters relative to the signal-space of the desired signal are used. The filters may be analog or digital filters for filtering in the analog or digital domains, respectively. The filtering process produces a matched-filtered signal and a mis-matched-filtered signal that is orthogonal to, or nearly orthogonal to, the matched-filtered signal, for each of a plurality of spatially-separated signal channels. By definition, the desired signal is present in the matched-filtered signal, whereas the interference signal is present in both the matched-filtered signal and the mis-matched-filtered signal. The filters produce an enhancement of the signal-to-interference (S-I) ratio in the matched-filtered signal and a cancellation of the desired signal in the mis-matched-filtered signal such that only the isolated interference signal remains in the mis-matched-filtered signal. Characteristics of the isolated interference signal in the mis-matched-filtered signal are then used to remove the interference signal from the matched-filtered signal, leaving only the target signal.

In accordance with illustrative embodiments described herein, interference mitigation is achieved using a single pulse over some number of spatial channels defined by an array of antenna elements. Thus, the desired signal and the interference are separated in the spatial dimension, which implies that the signal and the interference are emitted from sources located at different angles of arrival. This aspect of the invention is very different from known techniques and systems for performing interference suppression, which, as described above, typically use time averaging of returns over relatively long time periods to estimate signal statistics. As indicated above, the known approach assumes that the statistics of both the interference and the desired signal are stationary for the averaging time period, which is not always a valid assumption. The invention obviates the need to perform time averaging over multiple pulses in that the invention creates the necessary mitigation of interference in fast-time (e.g., a single pulse). Consequently, reliance on the assumption that the signal statistics are stationary over an averaging time period is avoided.

In order to demonstrate principles and concepts of the invention, two illustrative embodiments are described herein, namely, a system and method that use an analog process for a phased array radar application and a system and method that use a digital process for a synthetic aperture radar application. The analog process is particularly useful in cases in which the interference power level is significantly higher than the background noise level (and even the signal level) and would therefore saturate analog-to-digital conversion (ADC) circuitry. When the interference-to-noise level and the desired signal level are such that ADC circuitry would be saturated, both the matched-filtered signal and the mis-matched-filtered signal occur in the analog domain. With the analog process, interference-to-noise levels of over 100 dB can be mitigated.

The digital process is particularly useful at lower interference-to-noise levels where ADC circuitry would not be saturated. In cases in which the interference-to-noise levels are not high enough to saturate ADC circuitry, the received signal can be digitized directly or mixed to an intermediate frequency and then digitized. The matched and mis-matched filtering processes are then performed in the digital domain using a digital copy of the received signal sampled in fast-time (pulse).

FIG. 1 is a block diagram of a system 100 for mitigating electromagnetic interference in accordance with one illustrative, or exemplary, embodiment in which the aforementioned analog process is used to perform the matched and mis-matched filtering processes. In accordance with this embodiment, the system 100 is configured to perform the matched and mis-matched filtering in the analog domain because it is expected that the interference-to-noise ratio would likely saturate ADC circuitry. The system 100 includes an array of spatially-separated antenna elements 102 for receiving electrical signals over the air, an analog electrical circuit 104 for processing the electrical signals received by one of the antenna elements 102a of the array 102 in the analog domain, and a digital processor 132 for processing the output of the electrical circuit 104 to perform interference mitigation. The electrical circuit 104 includes a low noise amplifier 106, a power splitter 108, a modulated reference signal generator 110, first and second mixers 116 and 118, first and second bandpass filters 124 and 126, and first and second ADC circuits 128 and 130. Each signal channel has one of the antenna elements of the array 102 and one of the electrical circuits 104 associated with it. For ease of illustration, only one of the electrical circuits 104 is shown in FIG. 1. For ease of discussion and in the interest of brevity, the manner in which the system 100 processes electrical signals received by the antenna elements of the array 102 will be described with reference to a single signal channel.

The desired received signal, S, also referred to herein as the target signal, is expressed spatially as, $$\vec{S} = [S_1 \ S_2 \ldots S_N]^T \qquad (1)$$

Similarly, the interference signal is expressed spatially as, $$\vec{J} = [J_1 \ J_2 \ldots J_N]^T \qquad (2)$$

The signal received at the $k^{th}$ antenna element 102a is comprised of the sum of the target signal and the interference signal, which is expressed mathematically as $S_k+J_k$, where k is a number between 0 and N, where N is the total number of antenna elements in the array 102. The system 100 operates as follows. The $k^{th}$ antenna element 102a receives an electrical signal over the air and outputs a corresponding electrical signal to the low noise amplifier 106. The low noise amplifier 106 amplifies the electrical signal and outputs the amplified electrical signal to the power splitter 108, which splits the electrical signal into first and second electrical signals. The first and second electrical signals are input to the first and second mixers 116 and 118, respectively. The modulated reference signal generator 110 generates first and second reference signals 112 and 114, respectively, which are input to the first and second mixers 116 and 118, respectively.

The first reference signal 112 has a modulation superimposed on it in the first mixer 116 that is matched to the modulation of the target signal, i.e., the signal that the system 100 would receive in the absence of interference. The second reference signal 114 has a modulation superimposed on it in the second mixer 118 that is mis-matched from the target signal, i.e., a modulation that is orthogonal, or nearly orthogonal to, the modulation of the target signal. The first and second mixers 116 and 118 perform the mixing process in fast-time (i.e., pulse) to produce versions of the received signal mixed with two orthogonal, or nearly orthogonal, modulations without affecting its spatial properties (e.g., angle of arrival).

Exiting the mixers 116 and 118, the signals 120 and 122 pass through bandpass filters 124 and 126, respectively, which perform bandpass filtering, thereby completing the filtering process to obtain matched $[R \cdot (S_k+J_k)]$ and mis-matched $[R' \cdot J_k]$ correlation signals, where R represents the first reference signal, R' represents the second reference signal, $S_k$ represents the electrical signal received by the $k^{th}$ antenna element 102a, and $J_k$ represents the interference signal received by the $k^{th}$ antenna element 102a. The bandpass filtered signals then enter the ADC circuits 128 and 130, which convert the analog signals into respective digital signals. The digital signals are then transferred to the processor 132, which performs additional interference mitigation processing, as will be described below in detail with reference to FIG. 3. The electrical circuit 104 and the processor 132 together form an electrical processing circuit for performing interference mitigation. A memory device 133 that is in communication with the processor 132 stores computer code for execution by the processor 132 and typically also stores data.

The memory device 133 may be any computer-readable medium capable of storing program code and data thereon, such as, for example, a random-access memory (RAM) device, a read-only memory (ROM) device, a programmable ROM (PROM) device, an erasable PROM (EPROM) device, a flash memory device, a compact disc (CD), a digital versatile disc (DVD), a hard disk drive, a tape drive, and a memory card or stick. The processor 132 may be any type of processing device capable of processing computer code and data, such as, for example, a microprocessor, a microcontroller, a programmable gate array (PGA), a programmable logic array (PLA), an application specific integrated circuit (ASIC), a system on a chip (SOC), a system in package (SIP), a digital signal processor (DSP), and a combination or two or more of such devices.

Figure 2:
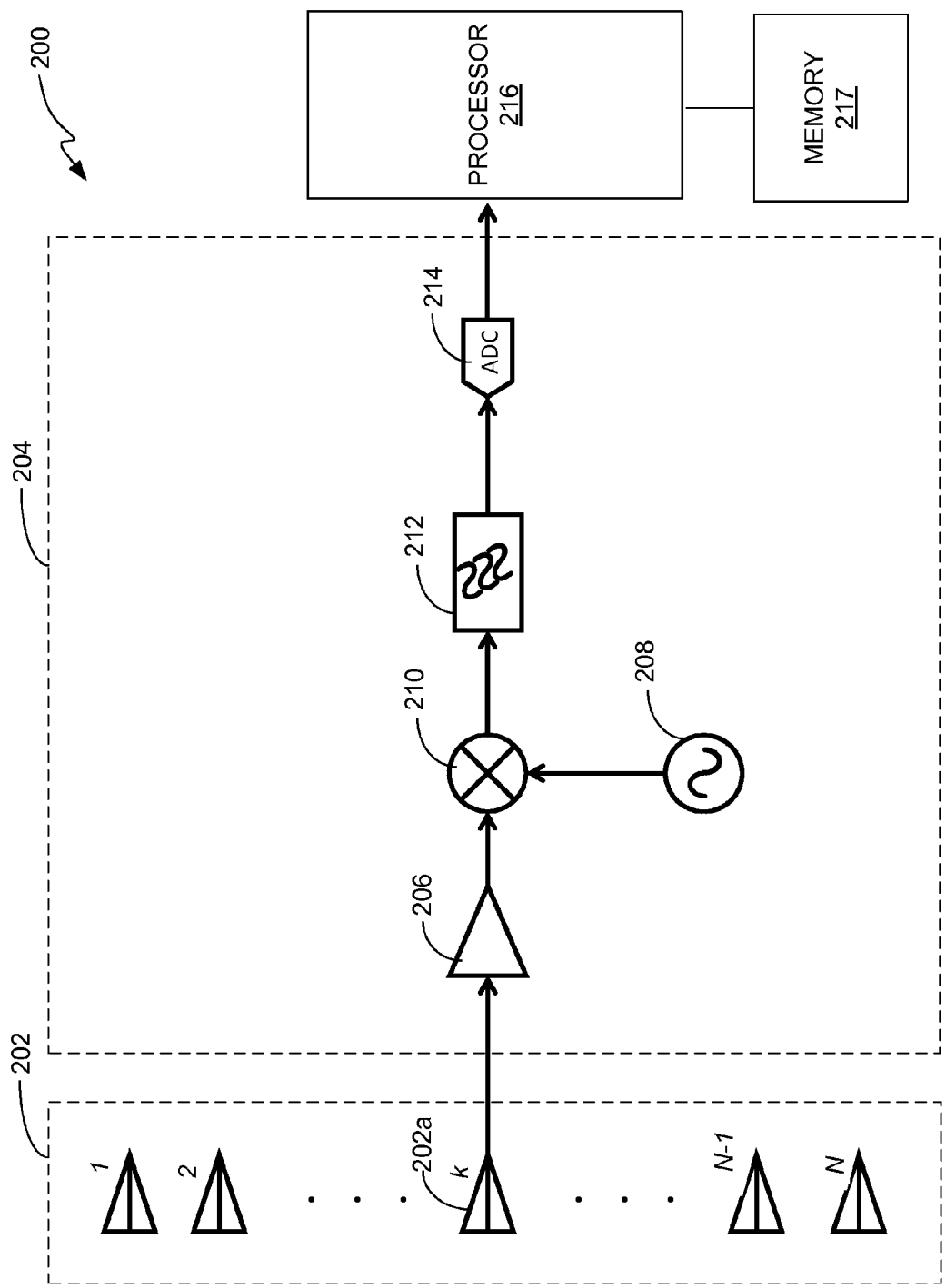
FIG. 2 is a block diagram of another illustrative embodiment of a system designed to mitigate electromagnetic interference.

FIG. 2 is a block diagram of another illustrative embodiment of a system 200 for mitigating electromagnetic interference. In accordance with this illustrative, or exemplary, embodiment, the system 200 is configured to mitigate interference where the interference-to-noise ratio would likely not saturate ADC circuitry. For this reason, the matched and mis-matched-filtering processes are performed in the digital domain. The system 200 includes an array 202 of spatially-separated antenna elements, an analog electrical circuit 204 and a digital processor 216. The analog electrical circuit 204 includes a low noise amplifier 206, a modulated reference generator 208, a mixer 210, a bandpass filter 212, and ADC circuitry 214.

Each signal channel has one of the antenna elements of the array 202 and one of the electrical circuits 204 associated with it. For ease of illustration, only one of the electrical circuits 204 is shown in FIG. 2. For ease of discussion and in the interest of brevity, the manner in which the system 200 processes electrical signals received by the antenna elements of the array 202 will be described with reference to a single signal channel.

The target signal is described by, $$\vec{S}=[S_1\ S_2\ \ldots\ S_N]^T \quad (3)$$

Similarly, the interference signal is represented by, $$\vec{J}=[J_1\ J_2\ \ldots\ J_N]^T \quad (4)$$

The actual signal received at the $k^{th}$ antenna element 202a is comprised of the sum of the target signal and the interference signal, $S_k+J_k$. The system 200 operates as follows. An electrical signal is received at antenna element 202a. The antenna element 202a outputs an electrical signal (i.e., $S_k+J_k$) to amplifier 206. Amplifier 206 amplifies the electrical signal and delivers the amplified electrical signal to the mixer 210. The mixer 210 mixes the amplified electrical signal with a reference signal that is generated by the modulated reference generator 208. The signal exiting the mixer 210 passes through bandpass filter 212 and enters the ADC circuitry 214, which converts the analog signal into a digital signal. The digital signal is transferred to the processor 216 for interference mitigation processing, as will now be described with reference to FIG. 3. The electrical circuit 204 and the processor 216 together form an electrical processing circuit for performing interference mitigation. A memory device 217 that is in communication with the processor 216 stores computer code for execution by the processor 216 and typically also stores data.

The memory device 217 may be any computer-readable medium capable of storing program code and data thereon, such as, for example, a RAM device, a ROM device, a PROM device, an EPROM device, a flash memory device, a CD, a DVD, a hard disk drive, a tape drive, and a memory card or stick. The processor 216 may be any type of processing device capable of processing computer code and data, such as, for example, a microprocessor, a microcontroller, a PGA, a PLA, an ASIC, an SOC, an SIP, a DSP, and a combination or two or more of such devices.

Figure 3:
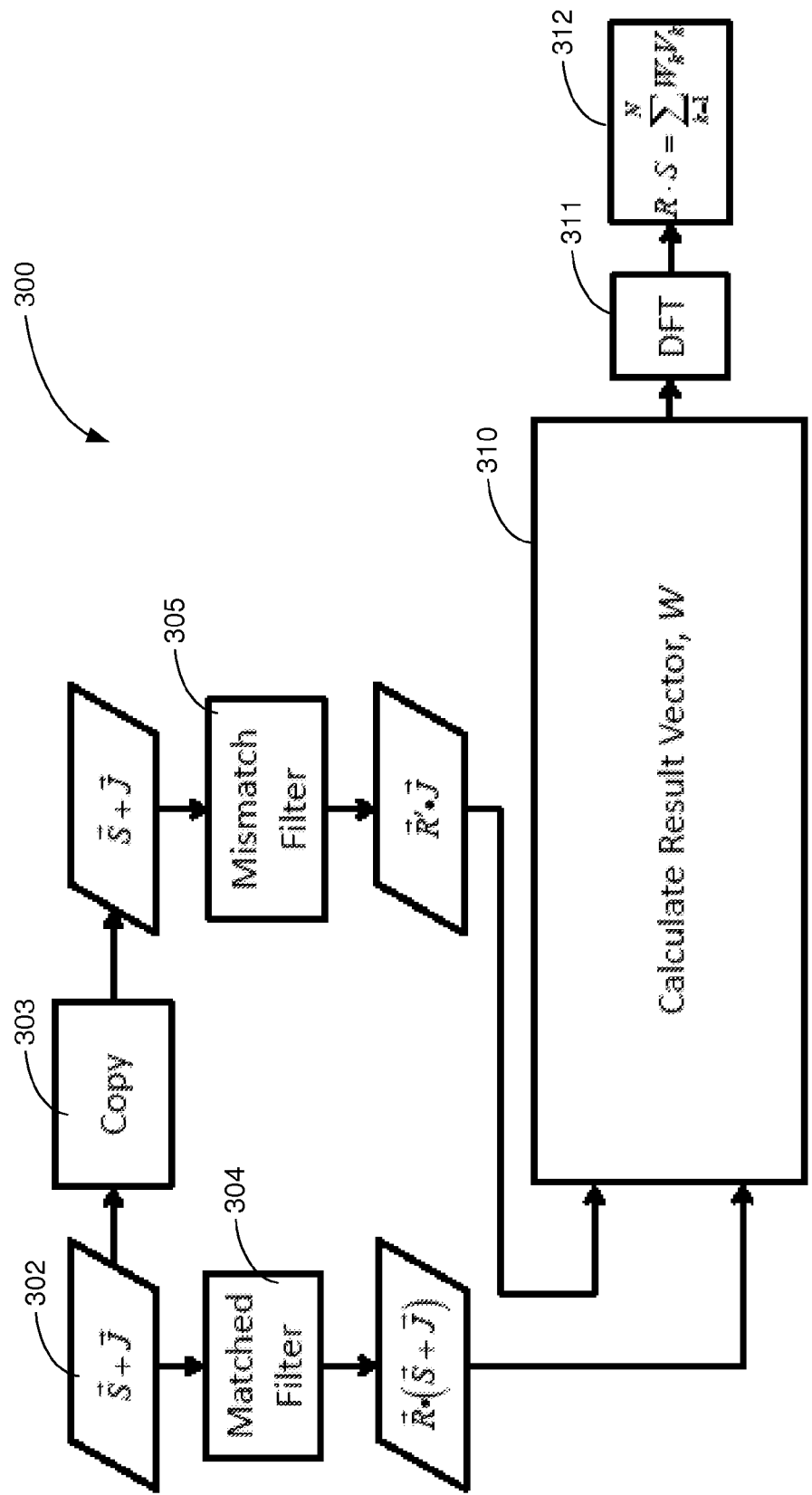
FIG. 3 is flow diagram that demonstrates an illustrative embodiment of the interference mitigation process.

FIG. 3 is a flow diagram of the portion of the interference mitigation process 300 that is performed by the processor 216 shown in FIG. 2 when the filtering process is performed in the digital domain. Blocks 310-312 of the flow diagram represent the portion of the interference mitigation process performed by the processor 132 shown in FIG. 1 when the filtering process is performed in the analog domain. If the interference mitigation process is to be performed by the processor 132 shown in FIG. 1, then the sub-processes, or steps, represented by blocks 302-305 in FIG. 3 are eliminated such that only the sub-processes represented by blocks 310-312 are performed. For exemplary purposes, it will be assumed that the interference mitigation process 300 is performed by the processor 216 shown in FIG. 2.

The process begins with inputting the received signal $S_k+J_k$ into the processor 216 as the signal is outputted from the electrical circuit 204 shown in FIG. 2. This step is represented by block 302. At the step represented by block 303, a copy of the received signal is made. At the step represented by block 304, a matched filter sub-process is performed on the received signal to obtain the result $[R \cdot (S_k+J_k)]$. At the step represented by block 305, a mis-matched filter sub-process is performed on the copy of the received signal to obtain the result $[R' \cdot J_k]$. The symbol "·" in FIG. 3 represents a dot product mathematical operation.

At the sub-process represented by block 310, a result vector, $W_k$, that is orthogonal to the interference vector $J_k$, is created by taking the dot product of the mismatched-filtered signal result of sub-process 305 for each of the signals, S+J, received by each of the antenna elements of the array 202 with a signal that is orthogonal to the matched result of sub-process 304 and subtracting this results from the matched-filtered signal, $$W_k = [R \cdot (S_k + J_k)] - \frac{[R \cdot (\vec{S}+\vec{J})][R' \cdot \vec{J}]^H}{[R \cdot \vec{J}][R' \cdot \vec{J}]^H}[R' \cdot J_k]. \tag{5}$$

The result vector $W_k$ is a representation of the matched-filtered signal received by the antenna array 202 without the interference. In accordance with this illustrative embodiment, a discrete Fourier transform (DFT) sub-process represented by block 311 is performed on the result vector $W_k$ to obtain a steering vector, V. The DFT reaches its maximum magnitude at $\theta_{max}$, where $$\theta_{max} = \max_{\theta}(DFT(\vec{W})). \tag{6}$$

The steering vector, V, defined by $$\vec{V} = e^{2\pi \frac{\vec{D}}{\lambda} sin(\theta_{max})}, \tag{7}$$

is obtained and then used in the sub-process represented by block 312 to obtain an estimate of the match filtered target signal, R·S, as $$R \cdot S = \sum_{k=1}^{N} W_k V_k. \tag{8}$$

The embodiments described above make use of an observation that the received signal has both temporal and spatial properties that make it possible to filter the signal into separate, respective filtered signals that are orthogonal to one another. The spatial property may be angle or range. The temporal property may be code division multiple access (CDMA), time division multiple access (TDMA) or frequency division multiple access (FDMA). The received signal is sampled in both dimensions and then filtered into the matched-filtered signal and into the mis-matched-filtered signal, which is orthogonal to, or nearly orthogonal to, the matched-filtered signal. As indicated above, the interference signal is present in both the matched-filtered signal and the mis-matched-filtered signal whereas the target signal is present in only the matched-filtered signal. In the matched-filtered signal, the interference signal is different from the matched-filtered signal in the temporal property, but is the same as the matched-filtered signal in the spatial property. The aforementioned result vector, W is obtained by processing the match-filtered signal and the mis-matched-filtered signal in accordance with Equation (5) above to separate the target signal S from the interference signal J.

Figure 4:
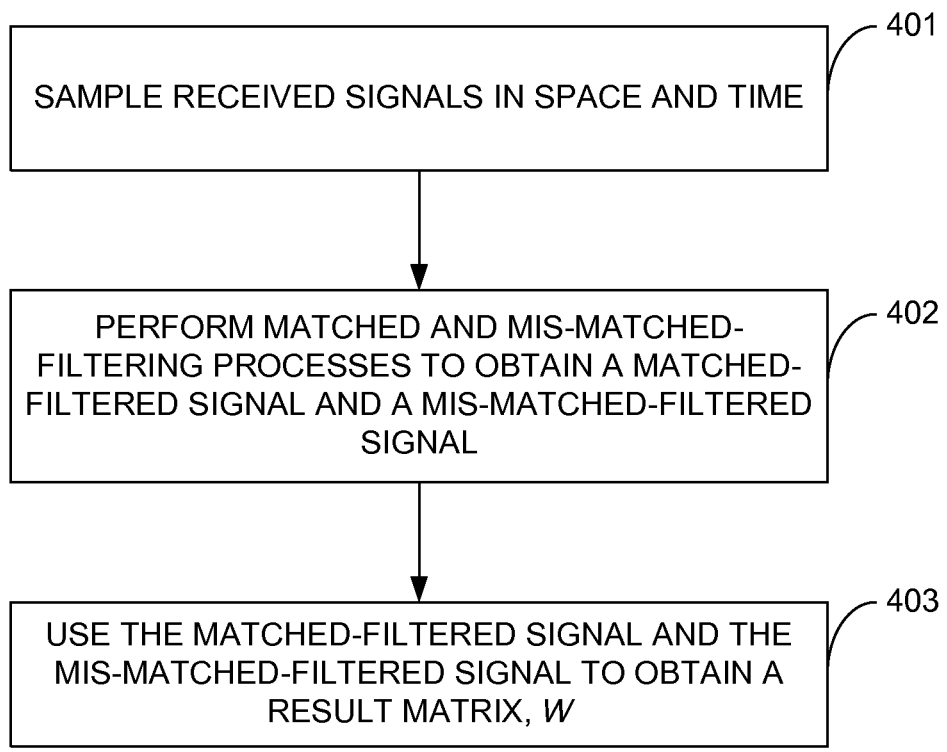
FIG. 4 is a flowchart that represents the method for mitigating interference in accordance with an illustrative embodiment.

FIG. 4 is a flowchart that represents the method in accordance with an illustrative embodiment. A received signal that includes a target signal and an interference signal is sampled in space and time, as indicated by block 401. The sampled signal is then filtered into a matched-filtered signal and into a mis-matched-filtered signal, which is orthogonal to, or nearly orthogonal to, the matched-filtered signal, as indicated by block 402. The processes represented by blocks 401 and 402 are performed for all of the signals received by all of the antenna elements of the array. The matched-filtered signal and the mis-matched-filtered signal are then processed to obtain a result vector, W, as indicated by block 403. The result vector W is an estimation of the target signal without the interference. As indicated above with reference to FIG. 3, a DFT may then be used to obtain a steering vector V that may then be multiplied by the result vector W to obtain an even better estimate of the target signal S. This latter step is not mandatory, but is preferred.

It should be noted that the invention has been described with reference to a few illustrative, or exemplary, embodiments in order to demonstrate the principles and concepts of the invention. It will be understood by those skilled in the art that the invention is not limited to these embodiments, but may be modified in a number of ways while still achieving the goals of the invention. For example, the circuit elements or logic that is used to perform the filtering processes, obtain the result vector may be different from those described above with reference to FIGS. 1-3. Persons skilled in the art will understand, in view of the description being provided herein, the manner in which the circuit elements or logic used for these purposes may be modified or varied while still achieving the goals of the invention.

What is claimed is:

1. A system for mitigating electromagnetic interference, the system comprising:
an array of N spatially-separated antenna elements, where N is a positive integer that is greater than or equal to 2;
at least one analog electrical circuit arranged to receive an electrical signal from a respective antenna element of the N spatially separated antenna elements, split the electrical signal into a first electrical signal and a second electrical signal, the analog electrical circuit introducing a first reference signal having a first modulation that is matched to a target signal and a second reference signal having a second modulation that is mis-matched to the target signal and mixing the first reference signal with one of the first electrical signal and the second electrical signal and mixing the second reference signal with the remaining one of the first electrical signal and the second electrical signal; and
a processing circuit arranged to receive a matched signal and a mis-matched signal from the at least one analog electrical circuit, wherein a respective target signal and a respective interference signal that are part of the respective received electrical signal are present in the matched signal and wherein the interference signal, but not the target signal, is present in the mis-matched signal, and wherein the processing circuit generates a result vector, W, that is a representation of the target signal without the interference signal.

2. The system of claim 1, wherein the at least one analog electrical circuit includes respective bandpass filters that generate a matched-filtered signal and a mis-matched-filtered signal.

3. The system of claim 2, wherein each analog electrical circuit includes respective analog-to-digital converter (ADC) circuitry that converts the matched-filtered signal and the mis-matched-filtered signal into respective, digital matched-filtered and digital mis-matched-filtered signals, and wherein the processing circuit is a digital processor that processes the digital matched-filtered signals and the digital mis-matched-filtered signals in a digital domain to generate the result vector W.

4. The system of claim 1, wherein the processing circuit performs a discrete Fourier transform on the result vector W.

5. The system of claim 4, wherein the processing circuit determines an angle where the result vector W defines a maximum value.

6. The system of claim 5, wherein the angle is used by the processing circuit to generate a steering vector V.

7. The system of claim 6, wherein the steering vector V and the result vector W are used by the processing circuit to generate a revised representation of the target signal.

8. A method for mitigating electromagnetic interference comprising:
with an array of N spatially-separated antenna elements, receiving electrical signals, where N is a positive integer that is greater than or equal to 2;
with N analog electrical processing circuits electrically coupled to N respective antenna elements of the array of N spatially-separated antenna elements:
splitting an electrical signal received by the respective antenna element into a first electrical signal and a second electrical signal,
mixing a first reference signal having a first modulation that is matched to a target signal to the first electrical signal to generate a matched signal,
mixing a second reference signal having a second modulation that is mis-matched to the target signal to the second electrical signal to generate a mis-matched signal, wherein the target signal and an interference signal present in the electrical signal are also present in the matched signal and wherein only the interference signal is present in the mis-matched signal, and
with a processing circuit coupled to the N spatially-separated antenna elements, processing the matched signal and the mis-matched signal to generate a result vector, W, wherein the result vector W is a first representation of the target signals without the interference signals.

9. The method of claim 8, wherein each of the N analog electrical processing circuits includes respective bandpass filters that receive the matched signal and the mis-matched signal, respectively and generate a matched-filtered signal and a mis-matched filtered signal, respectively.

10. The method of claim 9, wherein each of the N analog electrical circuit includes respective analog-to-digital converter (ADC) circuitry that converts the matched-filtered and mis-matched-filtered signals into respective, digital matched-filtered and mis-matched-filtered signals.

11. The method of claim 8, further comprising:
performing a discrete Fourier transform on the result vector W to generate an intermediate representation in the frequency domain.

12. The method of claim 11, further comprising:
determining an angle where the result vector W defines a maximum value.

13. The method of claim 12, further comprising:
using the angle to generate a steering vector V.

14. The method of claim 13, further comprising:
generating a revised representation of the target signal as a function of the steering vector V and the result vector W.

15. A non-transitory computer-readable medium having computer code stored thereon for execution by a processor to perform mitigation of electromagnetic interference, the computer code comprising:
a first code segment that when executed by the processor buffers a digital representation of a matched-filtered signal and a digital representation of a mis-match-filtered signal, the matched-filtered signal responsive to a first modulation superimposed on a received electrical signal, the mis-matched filtered signal responsive to a second modulation superimposed on the received electrical signal, the first and second modulation superimposed in an analog electrical circuit, the mis-matched-filtered signal being orthogonal to the respective matched-filtered signal, wherein a respective target signal and a respective interference signal are present in the matched-filtered signal and wherein only the interference signal is present in the mis-matched-filtered signal; and
a second code segment that when executed by the processor generates a result vector, W, as a function of the matched-filtered signal and the mis-matched-filtered signal, wherein the result vector W is a first representation of the target signal without the interference signal.

16. The non-transitory computer readable medium of claim 15, further comprising a third code segment that when executed by the processor performs a discrete Fourier transform on the result vector W.

17. The non-transitory computer readable medium of claim 16, further comprising a fourth code segment that when executed by the processor determines an angle where the result vector W defines a maximum value.

18. The non-transitory computer readable medium of claim 17, wherein the angle is used to generate a steering vector V.

19. The non-transitory computer readable medium of claim 18, wherein the steering vector V and the result vector W are used by a fifth code segment that when executed by the processor generates a revised representation of the target signal.

* * * * *